(12) United States Patent
McKee

(10) Patent No.: US 12,446,582 B2
(45) Date of Patent: Oct. 21, 2025

(54) **METHODS OF CONTROLLING OR PREVENTING INFESTATION OF CEREAL PLANTS BY PHYTOPATHOGENIC MICROORGANISMS *FUSARIUM PSEUDOGRAMINEARUM***

(71) Applicant: SYNGENTA CROP PROTECTION AG, Basel (CH)

(72) Inventor: Kenneth McKee, Sydney (AU)

(73) Assignee: SYNGENTA CROP PROTECTION AG, Basel (CH)

( * ) Notice: Subject to any disclaimer, the term of this patent is extended or adjusted under 35 U.S.C. 154(b) by 919 days.

(21) Appl. No.: 17/277,522

(22) PCT Filed: Sep. 16, 2019

(86) PCT No.: PCT/EP2019/074640
§ 371 (c)(1),
(2) Date: Mar. 18, 2021

(87) PCT Pub. No.: WO2020/058160
PCT Pub. Date: Mar. 26, 2020

(65) Prior Publication Data
US 2022/0030864 A1    Feb. 3, 2022

(30) Foreign Application Priority Data

Sep. 19, 2018 (EP) ................................ 18195489
Jan. 23, 2019 (EP) ................................ 19153302

(51) Int. Cl.
*A01N 43/40*    (2006.01)
*C07D 213/54*   (2006.01)

(52) U.S. Cl.
CPC ........... *A01N 43/40* (2013.01); *C07D 213/54* (2013.01)

(58) Field of Classification Search
CPC .............................. A01N 43/40; C07D 213/54
See application file for complete search history.

(56) References Cited

U.S. PATENT DOCUMENTS 9,867,371 B2 * 1/2018 O'Sullivan ........... C07C 233/14
2015/0045213 A1   2/2015 O'Sullivan et al.
2016/0157485 A1   6/2016 O-Sullivan et al.

FOREIGN PATENT DOCUMENTS

| JP | 2015514077 A  | 5/2015 |
| WO | 2016066644 A1 | 5/2016 |
| WO | 2019030307 A1 | 2/2019 |
| WO | 2019105933 A1 | 6/2019 |
| WO | 2019122012 A1 | 6/2019 |
| WO | 2019158476 A1 | 8/2019 |
| WO | 2020058160 A1 | 3/2020 |

OTHER PUBLICATIONS

Translation of Brazilian Office Action BR112021005127-9 dated Jan. 18, 2023, 6 pages.
Partial European Search Report for EP Application No. EP18195489 mailed Oct. 18, 2018.
Extended European Search Report for EP Application No. EP18195489 mailed Feb. 18, 2019.
Written Opinion of the International Searching Authority and International Search Report for International Application No. PCT/EP2019/074640 mailed Mar. 10, 2020.
F. Obanor et al: "Fusarium graminearum and Fusarium pseudograminearum caused the 2010 head blight epidemics in Australia: The causes of Australian head blight", Plant Pathology, vol. 62, Apr. 5, 2012, pp. 79-91.
P. K. Mishra et al: "Genetic diversity and recombination within populations of Fusarium pseudograminearum from western Canada Introduction", International Microbiology, vol. 9, Jan. 1, 2006, pp. 65-68.

* cited by examiner

*Primary Examiner* — Kamal A Saeed
(74) *Attorney, Agent, or Firm* — BakerHostetler; Toni-Junell Herbert

(57) ABSTRACT

The present invention relates to methods for controlling or preventing infestation of cereal plants by the phytopathogenic microorganism *Fusarium pseudograminearum*, comprising applying to a crop of plants, the locus thereof, or seed thereof, a compound according to formula (I) wherein R1, R2, R3, R4, R5, Y, A, B are as defined herein.

28 Claims, No Drawings

METHODS OF CONTROLLING OR PREVENTING INFESTATION OF CEREAL PLANTS BY PHYTOPATHOGENIC MICROORGANISMS *FUSARIUM PSEUDOGRAMINEARUM*

CROSS-REFERENCE TO RELATED APPLICATIONS

This application is a 371 National Stage application of International Application No. PCT/EP2019/074640 filed Sep. 16, 2019 which claims priority to EP 18195489.2, filed Sep. 19, 2018, and EP 19153302.5, filed Jan. 23, 2019, the entire contents of these applications are hereby incorporated by reference.

TECHNICAL FIELD

The present invention relates to methods for controlling or preventing infestation of cereal plants by the phytopathogenic microorganism *Fusarium pseudograminearum*.

BACKGROUND

Crown rot is one of the top yield-robbing pests in wheat. Crown rot is predominantly caused by the phytopathogenic fungus *Fusarium pseudograminearum*. Across the United States, average losses in winter wheat resulting from crown rot have been estimated to be as high as 9.5% through large areas of the Pacific Northwest and similar losses are seen in other western states in the United States. Beyond North America, crown rot is a particularly concerning disease in Australia. In the past three decades, crown rot has become the disease of greatest relative importance in the northern grain producing regions of Australia. Experts believe that the recent surge in crown rot prevalence in Australia results from cereals being grown in closer rotations and stubble retention practices becoming more prevalent. Furthermore, in seasons where environmental conditions permit, crown rot can decrease wheat yield by up to 100% in Australia and up to 65% in North America.

Hence, there is a continuous need for finding improved methods to treat diseases associated with the phytopathogenic fungus *Fusarium pseudograminearum*. Thus, the current invention provides further methods for controlling or preventing infestation of cereal plants by the phytopathogenic microorganism *Fusarium pseudograminearum*.

DESCRIPTION OF THE EMBODIMENTS

Cyclobutylcarboxamide compounds and processes for their preparation have been disclosed in WO2013/143811 and WO2015/003951. It has now surprisingly been found that particular cyclobutylcarboxamide compounds disclosed in WO2013/143811 and/or WO2015/003951 are highly effective at controlling or preventing the infestation of cereal plants by the phytopathogenic microorganism *Fusarium pseudograminearum*. These highly effective compounds thus represent an important new solution for farmers to control or prevent the crown rot disease in cereal plants, in particular in wheat and barley, more particularly wheat.

Hence, as embodiment 1, there is provided a method of controlling or preventing infestation of cereal plants by the phytopathogenic microorganism *Fusarium pseudograminearum*, comprising applying to a crop of plants, the locus thereof, or seed thereof, a compound according to formula (I)

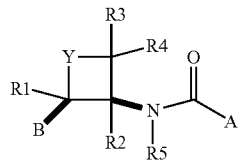

wherein
Y is O, C=O, or CR12R13;
A is a 5- or 6-membered heteroaromatic ring containing 1 to 3 heteroatoms, each independently selected from oxygen, nitrogen and sulphur, or a phenyl ring; the heteroaromatic ring or the phenyl being optionally substituted by one or more R6;
R6 is, independently of each other, halogen, cyano, C1-C4-alkyl, C1-C4-haloalkyl, C1-C4-alkoxy, C1-C4-haloalkoxy, C1-C4-haloalkylthio, C1-C4-alkoxy-C1-4-alkyl or C1-C4-haloalkoxy-C1-C4-alkyl;
R1, R2, R3, R4, R12 and R13, independently of each other, are hydrogen, halogen, cyano, C1-C4-alkyl, C1-C4-alkoxy or C1-C4-haloalkyl,
R5 is hydrogen, methoxy or hydroxyl,
B is phenyl substituted by one or more R8,
R8 is, independently of each other, halogen, cyano or a group -L-R9, where each L is independently of each other a bond, —O—, —OC(O)—, —NR7-, —NR7CO—, —NR7S(O)n-, —S(O)n-, —S(O)nNR7-, —COO— or CONR7-,
n is 0, 1 or 2,
R7 is hydrogen, C1-C4-alkyl, C1-C4-haloalkyl, benzyl or phenyl, where benzyl and phenyl is unsubstituted or substituted with halogen, cyano, C1-C4-alkyl or C1-C4-haloalkyl,
R9 is, independently of each other, C1-C6-alkyl, which is unsubstituted or substituted by one or more R10, C3-C6-cycloalkyl, which is unsubstituted or substituted by one or more R10, C6-C14-bicycloalkyl, which is unsubstituted or substituted by one or more R10, C2-C6-alkenyl, which is unsubstituted or substituted by one or more R10, C2-C6-alkynyl, which is unsubstituted or substituted by one or more R10, phenyl, which is unsubstituted or substituted by R10, or heteroaryl, which is unsubstituted or substituted by one or more R10,
R10 is, independently of each other, halogen, cyano, C1-C4-alkyl, C1-C4-haloalkyl, C1-C4-alkoxy, C1-C4-haloalkoxy, C1-C4-alkylthio, C1-C4-haloalkylthio, C3-C6-alkenyloxy, or C3-C6-alkynyloxy;
or a salt or N-oxide thereof;
wherein B and A-CO—NR5 are cis to each other on the four-membered ring,
or a tautomer or stereoisomer of these compounds.

More preferred methods according to embodiment 1 are given in the embodiments below.

As embodiment 2, there is provided a method according to embodiment 1 wherein
Y is O or CH2;
A is a 6-membered heteroaromatic ring containing 1 to 2 nitrogen atoms, or a phenyl ring; the heteroaromatic ring or the phenyl being optionally substituted by one or more R6;
R6 is, independently of each other, halogen, cyano, C1-C4-alkyl, C1-C4-haloalkyl, or C1-C4-haloalkoxy;
R1, R2, R3, R4, and R5 are each hydrogen;

B is phenyl substituted by one or more R8;

R8 is, independently of each other, selected from halogen, cyano, C1-C4-alkyl, C1-C4-haloalkyl, C1-C4-haloalkoxy and C3-C6-cycloalkyl.

As embodiment 3, there is provided a method according to either embodiment 1 or embodiment 2 wherein A is a 6-membered heteroaromatic ring containing 1 to 2 nitrogen atoms and having 1 to 3 substituents selected from R6, or a phenyl ring having 1 or 3 substitutents selected from R6.

As embodiment 4, there is provided a method according to any one of embodiments 1 to 3 wherein B is a phenyl substituted by 1 to 3 substitutents R8.

As embodiment 5, there is provided a method according to any one of embodiments 1 to 4 wherein B is a phenyl substituted by 1 to 3 substituents, independently selected from fluoro, chloro, trifluoromethyl, cyclopropyl, difluoromethoxy and trifluoromethoxy;

A is a phenyl, pyridyl or pyrazinyl, which rings, independently of each other, are unsubstituted or substituted by 1 to 3 substituents, independently selected, from chloro, bromo, fluoro, methyl, cyano, and trifluoromethyl, Y is O or CH2, and R1, R2, R3, R4 and R5 are each hydrogen.

As embodiment 6, there is provided a method according to any one of embodiments 1 to 5 wherein Y is CH2;

B is a mono or di-halogen substituted phenyl;

A is selected from phenyl, pyrazinyl and pyridyl, each of which is mono or di-substituted by substituents independently selected from halogen and C1-C4-haloalkyl;

R1, R2, R3, R4 and R5 are each hydrogen.

Compounds of formula (I) as disclosed in any one of embodiments 1 to 6 represent the cis racemate: the phenyl ring on the left hand side and the A-C(=O)—NH group on the right hand side are cis to each other on the cyclobutyl ring:

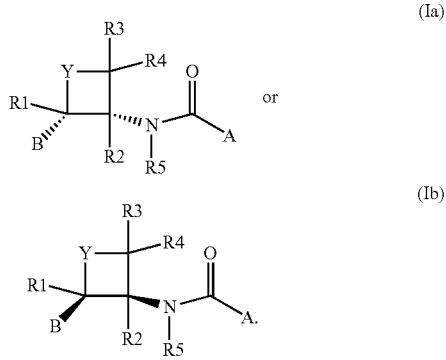

Thus, the racemic compound of formula (I) is a 1:1 mixture of the compounds of formula (Ia) and (Ib).

The wedged bonds shown in the compounds of formula (Ia) and (Ib) represent absolute stereochemistry, whereas the thick straight bonds such as those shown for the compounds of formula (I) represent relative stereochemistry in racemic compounds.

It has also surprisingly been found that one enantiomer of the compounds of formula (I) is particularly useful in controlling or preventing infestation of cereal plants by the phytopathogenic microorganism *Fusarium pseudograminearum*.

Thus, as embodiment 7, there is provided the method according to embodiment 1 wherein the compound is of formula (Ia)

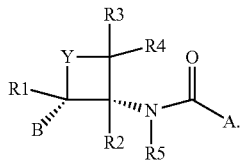

A skilled person is aware that according to the method of embodiment 1, the compound of formula (Ia) is generally applied as part of a pesticidal composition. Hence, as embodiment 8, there is provided a method of controlling or preventing infestation of cereal plants by the phytopathogenic microorganism *Fusarium pseudograminearum*, comprising applying to a crop of plants, the locus thereof, or seed thereof a pesticidal composition comprising a compound as defined in any one of embodiments 1-7 and one or more formulation adjuvants. As embodiment 9, there is provided a method of controlling or preventing infestation of cereal plants by the phytopathogenic microorganism *Fusarium pseudograminearum*, comprising applying to a crop of plants, the locus thereof, or seed thereof a pesticidal composition comprising a compound of formula (Ia) and one or more formulation adjuvants. In a method according to embodiment 9, for pesticidal compositions comprising both a compound of formula (Ia) and a compound of formula (Ib), the ratio of the compound of formula (Ia) to its enantiomer (the compound of formula (Ib)) must be greater than 1:1. Preferably, the ratio of the compound of formula (Ia) to the compound of formula (Ib) is greater than 1.5:1, more preferably greater than 2.5:1, especially greater than 4:1, advantageously greater than 9:1, desirably greater than 20:1, in particular greater than 35:1.

Mixtures containing up to 50%, preferably up to 40%, more preferably up to 30%, especially up to 20%, advantageously up to 10%, desirably up to 5%, in particular up to 3%, of the trans stereoisomers of the compounds of formula (I) (i.e. wherein the B and the A-C(=O)—NH groups are trans to each other) are also understood to be part of this invention. Preferably, the ratio of the compound of formula (I) to its trans isomer is greater than 1.5:1, more preferably greater than 2.5:1, especially greater than 4:1, advantageously greater than 9:1, desirably greater than 20:1, in particular greater than 35:1.

Preferably, in a composition comprising the compound of formula (Ia), its trans isomer (i.e. wherein the B and the A-CO—NR2 groups are trans to each other) and the compound of formula (Ib), the composition comprises the compound of formula (Ia) in a concentration of at least 50%, more preferably 70%, even more preferably 85%, in particular over 90%, and particularly preferably over 95%, each based on the total amount of compound of formula (Ia), its trans isomer and the compound of formula (Ib).

Further, as embodiment 10, there is provided a method of controlling or preventing infestation of cereal plants by the phytopathogenic microorganism *Fusarium pseudograminearum*, comprising applying to a crop of plants, the locus thereof, or seed thereof, a compound according to formula (Ic)

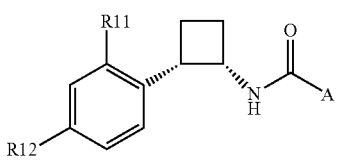

(Ic)

wherein

R11 and R12 are independently selected from halogen;

A is pyridyl which is substituted by one or two substituents independently selected from halogen and $C_1$-$C_4$-haloalkyl.

As embodiment 11, there is provided a method according to embodiment 10, wherein R11 and R12 are independently selected from chloro and fluoro;

A is pyrid-2-yl or pyrid-3-yl, which is substituted by one or two $C_1$-$C_4$-haloalkyl substituents.

As embodiment 12, there is provided a method according to embodiments 10 or 11, wherein A is selected from

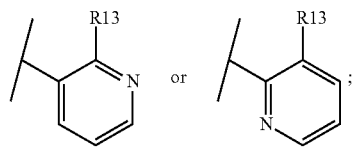

R13 is $C_1$-$C_4$-haloalkyl, preferably trifluoromethyl.

As embodiment 13, there is provided a method according to any one of embodiments 10 to 12 wherein the compound is selected from any one of compounds 1 to 7 of formula (Ic)

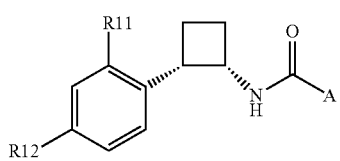

(Ic)

wherein R11, R12 and A are as defined in the following table:

| Compound | A | R11 | R12 |
|---|---|---|---|
| 1 | 2-trifluoromethyl-pyrid-3-yl | Cl | Cl |
| 2 | 3-trifluoromethyl-pyrid-2-yl | Cl | Cl |
| 3 | 3-trifluoromethyl-pyrid-2-yl | F | F |
| 4 | 3-trifluoromethyl-pyrid-2-yl | Cl | F |
| 5 | 3-chloro-pyrid-2-yl | Cl | Cl |
| 6 | 2-methyl-pyrid-3-yl | Cl | Cl |
| 7 | 2-trifluoromethyl-pyrid-3-yl | Cl | F |

As embodiment 14, there is provided a method according to any one of embodiments 10 to 12 wherein the compound is of formula (Ic)

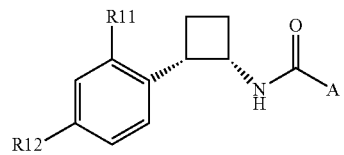

(Ic)

wherein R11, R12 and A are as defined in the following table:

| Compound | A | R11 | R12 |
|---|---|---|---|
| 1 | 2-trifluoromethyl-pyrid-3-yl | Cl | Cl |

The compound of embodiment 14, i.e. compound 1, has exhibited surprisingly strong biological activities against *Fusarium pseudograminearum* when used as a seed treatment for wheat seeds. In particular, compound 1 not only showed increased reduction of the amount of white heads compared to commercial seed treatments (see Biological Examples section), but compound 1 also substantially increased the yield of the wheat compared to commercial treatments. In fact, the yield increased more than twice as much when applying compound 1 as seed treatment compared to other commercial treatments. This is surprising as skilled people are aware that one cannot predict the level of activity a class of compounds have against a specific species of *Fusarium* fungus (see Biological Examples).

As embodiment 15, there is provided the method according to any one of embodiments 1 to 14, wherein the cereal plant is wheat or barley, in particular wheat.

As embodiment 16, there is provided the method according to any one of embodiments 1 to 15, wherein the compound as defined in any one of embodiments 1 to 14 is applied as a seed treatment. In particular, the preferred rate of application to the seed is in the range of 0.002 and 0.03 mg AI per seed.

As embodiment 17, there is provided the method according to any one of embodiments 1 to 16 comprising the steps
  providing a composition comprising a compound as defined in any one of embodiments 1 to 14, in particular compound 1;
  applying the composition to a seed;
  planting the seed.

As embodiment 18, there is provided the method according to any one of embodiments 1 to 16 comprising the steps
  providing a composition comprising a compound as defined in any one of embodiments 1 to 14, in particular compound 1;
  applying the composition to a crop of plants or the locus thereof.

As embodiment 19, there is provided the use of a compound as defined in any one of embodiments 1 to 14 for controlling or preventing infestation of cereal plants by the phytopathogenic microorganism *Fusarium pseudograminearum*, in particular for controlling or preventing infestation of wheat and barley, more particularly wheat.

As embodiment 20, there is provided a method for growing cereal plants comprising applying or treating cereal plants or a seed thereof with a compound as defined in any one of embodiments 1 to 14.

As another embodiment 21, the method according to embodiment 20 is applied as a seed treatment. In particular, the preferred rate of application to the seed is in the range of 0.002 and 0.03 mg AI per seed, more particularly in the range of 0.002 and 0.015 mg AI per seed.

The preparation of the compounds as defined in the methods of any one of embodiments 1 to 14 has been disclosed in WO2013/143811 and WO2015/003951 which are incorporated herein by reference.

Definitions

The term "halogen" represents fluoro, chloro, bromo or iodo, particularly fluoro, chloro or bromo.

The term "alkyl" or "alk" as used herein either alone or as part of a larger group (such as alkoxy, alkylthio, alkoxycarbonyl and alkylcarbonyl) is a straight or branched chain and is, for example, methyl, ethyl, n-propyl, n-butyl, isopropyl, sec-butyl, isobutyl, tert-butyl, pentyl, iso-pentyl or n-hexyl. The alkyl groups are suitably $C_1$-$C_4$-alkyl groups.

"Haloalkyl" as used herein are alkyl groups as defined above which are substituted with one or more of the same or different halogen atoms and are, for example, $CF_3$, $CF_2Cl$, $CF_2H$, $CCl_2H$, $FCH_2$, $ClCH_2$, $BrCH_2$, $CH_3CHF$, $(CH_3)_2CF$, $CF_3CH_2$ or $CHF_2CH_2$.

The methods and uses according to any one of embodiments 1 to 21 are preferably for controlling or preventing infestation of the crop by phytopathogenic microorganisms of the *Fusarium pseudograminearum*, including *Fusarium* fungi that are resistant to other fungicides. *Fusarium* fungi that are "resistant" to a particular fungicides refer e.g. to strains of *Fusarium* that are less sensitive to that fungicide compared to the expected sensitivity of the same species of *Fusarium*. The expected sensitivity can be measured using e.g. a strain that has not previously been exposed to the fungicide.

Application according to the methods or uses according to any one of embodiments 1 to 21 is preferably to a crop of plants, the locus thereof or seed thereof. Preferably application is to a crop of plants or seed thereof, more preferably to seed. Application of the compounds of the invention can be performed according to any of the usual modes of application, e.g. foliar, drench, soil, in furrow etc.

The compounds as defined in any one of embodiments 1 to 14 are preferably used for pest control at 1 to 500 g/ha.

The compounds as defined in any one of embodiments 1 to 14 are suitable for use on any cereal plant, including those that have been genetically modified to be resistant to active ingredients such as herbicides, or to produce biologically active compounds that control infestation by plant pests.

Generally, a compound as defined in any one of embodiments 1 to 14 is used in the form of a composition (e.g. formulation) containing a carrier. A compound as defined in any one of embodiments 1 to 14 and compositions thereof can be used in various forms such as aerosol dispenser, capsule suspension, cold fogging concentrate, dustable powder, emulsifiable concentrate, emulsion oil in water, emulsion water in oil, encapsulated granule, fine granule, flowable concentrate for seed treatment, gas (under pressure), gas generating product, granule, hot fogging concentrate, macrogranule, microgranule, oil dispersible powder, oil miscible flowable concentrate, oil miscible liquid, paste, plant rodlet, powder for dry seed treatment, seed coated with a pesticide, soluble concentrate, soluble powder, solution for seed treatment, suspension concentrate (flowable concentrate), ultra low volume (ulv) liquid, ultra low volume (ulv) suspension, water dispersible granules or tablets, water dispersible powder for slurry treatment, water soluble granules or tablets, water soluble powder for seed treatment and wettable powder.

A formulation typically comprises a liquid or solid carrier and optionally one or more customary formulation auxiliaries, which may be solid or liquid auxiliaries, for example unepoxidized or epoxidized vegetable oils (for example epoxidized coconut oil, rapeseed oil or soya oil), antifoams, for example silicone oil, preservatives, clays, inorganic compounds, viscosity regulators, surfactant, binders and/or tackifiers. The composition may also further comprise a fertilizer, a micronutrient donor or other preparations which influence the growth of plants as well as comprising a combination containing the compound of the invention with one or more other biologically active agents, such as bactericides, fungicides, nematocides, plant activators, acaricides, and insecticides.

The compositions are prepared in a manner known per se, in the absence of auxiliaries for example by grinding, screening and/or compressing a solid compound of the present invention and in the presence of at least one auxiliary for example by intimately mixing and/or grinding the compound of the present invention with the auxiliary (auxiliaries). In the case of solid compounds of the invention, the grinding/milling of the compounds is to ensure specific particle size.

Examples of compositions for use in agriculture are emulsifiable concentrates, suspension concentrates, microemulsions, oil dispersibles, directly sprayable or dilutable solutions, spreadable pastes, dilute emulsions, soluble powders, dispersible powders, wettable powders, dusts, granules or encapsulations in polymeric substances, which comprise—at least—a compound as defined in any one embodiments 1 to 14 and the type of composition is to be selected to suit the intended aims and the prevailing circumstances.

As a rule, the compositions comprise 0.1 to 99%, especially 0.1 to 95%, of compound as defined in any one of embodiments 1 to 7 and 1 to 99.9%, especially 5 to 99.9%, of at least one solid or liquid carrier, it being possible as a rule for 0 to 25%, especially 0.1 to 20%, of the composition to be surfactants (% in each case meaning percent by weight). Whereas concentrated compositions tend to be preferred for commercial goods, the end consumer as a rule uses dilute compositions which have substantially lower concentrations of active ingredient.

Examples of foliar formulation types for pre-mix compositions are:
GR: Granules
WP: wettable powders
WG: water dispersable granules (powders)
SG: water soluble granules
SL: soluble concentrates
EC: emulsifiable concentrate
EW: emulsions, oil in water
ME: micro-emulsion
SC: aqueous suspension concentrate
CS: aqueous capsule suspension
OD: oil-based suspension concentrate, and
SE: aqueous suspo-emulsion.

Whereas, examples of seed treatment formulation types for pre-mix compositions are:
WS: wettable powders for seed treatment slurry
LS: solution for seed treatment
ES: emulsions for seed treatment
FS: suspension concentrate for seed treatment
WG: water dispersible granules, and
CS: aqueous capsule suspension.

Examples of formulation types suitable for tank-mix compositions are solutions, dilute emulsions, suspensions, or a mixture thereof, and dusts.

As with the nature of the formulations, the methods of application, such as foliar, drench, spraying, atomizing, dusting, scattering, coating or pouring, are chosen in accordance with the intended objectives and the prevailing circumstances.

The tank-mix compositions are generally prepared by diluting with a solvent (for example, water) the one or more pre-mix compositions containing different pesticides, and optionally further auxiliaries.

Suitable carriers and adjuvants can be solid or liquid and are the substances ordinarily employed in formulation technology, e.g. natural or regenerated mineral substances, solvents, dispersants, wetting agents, tackifiers, thickeners, binders or fertilizers.

Generally, a tank-mix formulation for foliar or soil application comprises 0.1 to 20%, especially 0.1 to 15%, of the desired ingredients, and 99.9 to 80%, especially 99.9 to 85%, of a solid or liquid auxiliaries (including, for example, a solvent such as water), where the auxiliaries can be a surfactant in an amount of 0 to 20%, especially 0.1 to 15%, based on the tank-mix formulation.

Typically, a pre-mix formulation for foliar application comprises 0.1 to 99.9%, especially 1 to 95%, of the desired ingredients, and 99.9 to 0.1%, especially 99 to 5%, of a solid or liquid adjuvant (including, for example, a solvent such as water), where the auxiliaries can be a surfactant in an amount of 0 to 50%, especially 0.5 to 40%, based on the pre-mix formulation.

Normally, a tank-mix formulation for seed treatment application comprises 0.25 to 80%, especially 1 to 75%, of the desired ingredients, and 99.75 to 20%, especially 99 to 25%, of a solid or liquid auxiliaries (including, for example, a solvent such as water), where the auxiliaries can be a surfactant in an amount of 0 to 40%, especially 0.5 to 30%, based on the tank-mix formulation.

Typically, a pre-mix formulation for seed treatment application comprises 0.5 to 99.9%, especially 1 to 95%, of the desired ingredients, and 99.5 to 0.1%, especially 99 to 5%, of a solid or liquid adjuvant (including, for example, a solvent such as water), where the auxiliaries can be a surfactant in an amount of 0 to 50%, especially 0.5 to 40%, based on the pre-mix formulation.

Whereas commercial products will preferably be formulated as concentrates (e.g., pre-mix composition (formulation)), the end user will normally employ dilute formulations (e.g., tank mix composition).

Preferred seed treatment pre-mix formulations are aqueous suspension concentrates. The formulation can be applied to the seeds using conventional treating techniques and machines, such as fluidized bed techniques, the roller mill method, rotostatic seed treaters, and drum coaters. Other methods, such as spouted beds may also be useful. The seeds may be presized before coating. After coating, the seeds are typically dried and then transferred to a sizing machine for sizing. Such procedures are known in the art. The compounds of the present invention are particularly suited for use in soil and seed treatment applications.

In general, the pre-mix compositions of the invention contain 0.5 to 99.9 especially 1 to 95, advantageously 1 to 50, % by mass of the desired ingredients, and 99.5 to 0.1, especially 99 to 5, % by mass of a solid or liquid adjuvant (including, for example, a solvent such as water), where the auxiliaries (or adjuvant) can be a surfactant in an amount of 0 to 50, especially 0.5 to 40, % by mass based on the mass of the pre-mix formulation.

There is provided a method of controlling or preventing infestation of cereal plants, in particular wheat, by phytopathogenic microorganisms selected from *Pyrenophora tritici-repentis* and *Septoria tritici*, comprising applying to a crop of plants, the locus thereof, or seed thereof, a compound according to any one of embodiments 1 to 14.

The invention will now be illustrated by the following non-limiting Examples. All citations are incorporated by reference.

Biological Examples (A) Demonstration of Variability of Fungicidal Activity Against Fungi from the *Fusarium* Genus Objective of the study was to evaluate the in vitro activity of three commercial fungicidal compounds against *Fusarium graminearum*, *Fusarium pseudograminearum* and *Fusarium subglutinans*.

Treatments:
  Product 1—Difenoconazole (Dividend™ FS030), 30 g ai/1000 ml
  Product 2—Thiabendazole (Tecto™ SC500), 500 g ai/1000 ml
  Product 3—Fludioxonil (Celest™ FS25), 25 g ai/1000 ml Test Dosages:
  100, 10, 1, 0.1, 0.01, 0 mg ai/l (ppm)

Test Organisms:
1. *Fusarium graminearum*, strain K6102 isolated from corn seeds from Kansas, USA
2. *Fusarium pseudograminearum*, Strain: CBS 109956 (Strain nr CBS 109956; Status Holotype strain of *Fusarium pseudograminearum*, Literature Aoki, T. & O'Donnell, K. 1999, Mycologia 91(4): 597-609. Collected by Burgess & Lester, 1980. Isolated from *Hordeum vulgare* (Gramineae), crowns Location Australia, New South Wales)
3. *Fusarium subglutinans*, strain K6135 isolated from corn seeds from Lombez, France Nutrient Medium:
The medium was prepared according to the following recipe:

| | |
|---|---|
| Glycerol | 20 ml |
| Yeast extract | 10 g |
| Oxoid agar no. 3 | 320 g |
| MgSO4 × 7H2O | 0.5 g |
| NaNO3 | 6.0 g |
| KCl | 0.5 g |
| KH2PO4 | 1.5 g |
| H2O | 900 ml |

Mycelium Growth Test:

The nutrient medium was autoclaved at 121° C. for 20 min, and then cooled to 55° C.

The fungicides were diluted in sterile water and mixed with the medium to the final concentration (100, 10, 1, 0.1, 0.01, 0 ppm). Each dish was inoculated with a mycelial disk (6 mm diameter) cut from the margin of 2 to 3 day old source colony of the respective *Fusarium* growing on nutrient-medium. After an incubation period of three days, at 20° C. in the dark, the diameter of the mycelium was measured including the agar disc, and the data converted to % activity.

Dose response curves were drawn by plotting percentage growth activity against fungicide concentration. EC 50-values were determined graphically. EC 50 is the dosage at which 50% growth inhibition occurs.

Summary

The table below shows the determined EC50-values:

| PRODUCT | EC-50 *Fusarium graminearum* | EC-50 *Fusarium pseudograminearum* | EC-50 *Fusarium subglutinans* |
|---|---|---|---|
| Product 1 | 0.030 | 0.580 | 0.150 |
| Product 2 | 0.400 | 2.100 | 1.450 |
| Product 3 | 0.020 | 0.070 | 30.500 |

Conclusions

Product 1 showed good activity against *F. graminearum* and *F. subglutinans*, but was less active against *F. pseudograminearum* by a factor 19 compared to *F. graminearum*.

Product 2 was less active against *F. pseudograminearum* by a factor 5 compared to *F. graminearum*. The activity against *F. subglutinans* was somewhere in between.

Product 3 was very active against *F. graminearum* and *F. pseudograminearum* (although more active against *F. graminearum*), but was very weak against *F. subglutinans*.

This illustrates that there is no expectation that a particular fungicidal active ingredient has similar biological activity against the many different *Fusarium* sub-species.

(B) Effect of Seed Treatments Against Crown Rot on Wheat

Introduction of the Disease Crown Rot in Wheat:

The disease is caused predominantly by the fungus *Fusarium pseudograminearum*. While seedling loss can occur, primary signs of infection are basal browning and when seasonal conditions induce significant plant stress late in the planting season, white heads and associated yield loss occur.

5 wheat trial locations were selected across the main wheat growing areas of Australia. All five sites have a history of crown rot and high stubble load coming out of susceptible rotation crop. Soil samples were taken to confirm the pathogen pressure. The seeds were treated with a Rotostat Seed Treater with 800 ml slurry volume per 100 kg of seeds. Planting for the trials took place between 2 June and 14 June using a 6 to 8 row planter. The number of plants was counted 35-65 days after sowing on 2×5 m row. The number of wheat plants with white heads per plot was assessed at full ripe and recorded as % compared to the untreated plants which were taken as reference. Yield grain data was taken at the end of the season.

Trial Locations:

| Trial ID # | Location in Australia | Sown | Variety | Resistance Status |
|---|---|---|---|---|
| AR0T020 | Merredin, WA | $2^{nd}$ June | Cobra | Sensitive |
| AR0T021 | Tammin, WA | $14^{th}$ June | Cobra | Sensitive |
| GS0T007 | Redhill, SA | $6^{th}$ July | Saintly (Durum) | Very sensitive |
| DL0T013 | Bunnaloo, NSW | $2^{nd}$ June | Aurora (Durum) | Very sensitive |
| N10T669 | Bellata, NSW | $7^{th}$ June | Lillaroi (Durum) | Sensitive |

Treatment List—Field Trials Carried Out:

| Treatment | | Active ingredient (AI) rate (mg ai/seed) |
|---|---|---|
| T1 | Untreated*/** | — |
| T2 | Compound 1*/** | 0.004 |
| T3 | Commercial Succinate dehydrogenase inhibitor*/** | 0.004 |
| T4 | Vibrance (Difenoconazole, Metalaxyl-M, Sedaxane) ** | (0.0096 + 0.0024 + 0.002) |
| T5 | Rancona Dimension (Ipconazole + Metalaxyl-M)** | (0.0032 + 0.0026) |

*Treatments with Apron™ XL (Metalaxyl-M, ES350) at 17 mL/100 kg seed (0.001 mg ai/seed)

**All treatments applied with CRUISER (Thiamethoxam, F5350) at 50 ml/100 kg seed (0.012 mg ai/seed)

Methodology:

| | |
|---|---|
| Crop | Wheat |
| Planting date | June 2017 |
| Target application timing | Seed Treatment |
| Application volume | 800 mL/100 kg |
| Equipment used | Rotostat Seed Treater |
| Plot size | Planter width (6-8 rows) × 12-15 m |
| Replication | 5 |

Assessment:

| Target | Assessments |
|---|---|
| Crop Stand Counts | Plant counts 2 × 5 m row (50%, 14 and 28 DAE) |
| White Head Counts | Count total and white heads per plot, record % white heads |
| Yield and Quality | Full plot harvest (tons/hectare) |

Final Emergence Counts:

| Treatment | AR0T020 | AR0T021 | GS0T007 | DL0T013 | N10T669 | Average | % increase compared to T1 |
|---|---|---|---|---|---|---|---|
| T1 | 100.00 | 100.00 | 100.00 | 100.00 | 100.00 | 100.00 | — |
| T2 | 101.87 | 118.36 | 113.09 | 100.80 | 103.48 | 107.52 | 7.52 |
| T3 | 115.18 | 124.71 | 129.15 | 100.97 | 99.40 | 113.88 | 13.88 |

-continued

| Treatment | AR0T020 | AR0T021 | GS0T007 | DL0T013 | N10T669 | Average | % increase compared to T1 |
|---|---|---|---|---|---|---|---|
| T4 | 106.91 | 117.70 | 126.01 | 99.03 | 100.00 | 109.93 | 9.93 |
| T5 | 97.27 | 119.62 | 122.87 | 103.19 | 105.04 | 109.60 | 9.60 |

White Heads:

| Treatment | AR0T020 | AR0T021 | GS0T007 | DL0T013 | N10T669 | Average | % reduction compared to T1 |
|---|---|---|---|---|---|---|---|
| T1 | 100.00 | 100.00 | 100.00 | 100.00 | 100.00 | 100.00 | — |
| T2 | 32.86 | 28.45 | 74.52 | 92.59 | 105.57 | 66.80 | 34.20 |
| T3 | 47.86 | 29.29 | 92.24 | 99.07 | 97.72 | 73.24 | 26.76 |
| T4 | 68.93 | 38.91 | 94.46 | 102.40 | 100.00 | 80.94 | 19.06 |
| T5 | 68.57 | 43.10 | 101.94 | 98.13 | 104.30 | 83.21 | 16.79 |

Plot Yields:

| Treatment | AR0T020 | AR0T021 | GS0T007 | DL0T013 | N10T669 | Average | % increase compared to T1 |
|---|---|---|---|---|---|---|---|
| T1 | 100.00 | 100.00 | 100.00 | 100.00 | 100.00 | 100.00 | — |
| T2 | 127.83 | 107.62 | 162.86 | 116.90 | 116.41 | 126.32 | 26.32 |
| T3 | 118.65 | 88.56 | 111.11 | 119.81 | 126.23 | 112.87 | 12.87 |
| T4 | 111.45 | 84.36 | 138.10 | 114.37 | 110.94 | 111.84 | 11.84 |
| T5 | 106.13 | 101.37 | 146.67 | 106.77 | 112.06 | 114.60 | 14.60 |

CONCLUSIONS

All treatments T2-T5 improved the crop establishment in the beginning of the season over the untreated reference. The number of white heads was reduced and this resulted in a yield increase at the end of the season.

However, compound 1 in treatment T2 was clearly the best treatment and showed surprisingly a reduction of white heads by 34 percent compared to T1 and a yield benefit of 26 percent compared to T1. Treatments T3, T4 and T5 performed all similar and increased the yield in a range of 11 to 15 percent compared to T1. These findings show the surprising effect of using a compound of embodiment 1 in a method of the invention. In particular, compound 1 surprisingly showed a yield increase of 26 percent which is more than double the yield increase found for current commercial treatments (T3-T5).

The invention claimed is:

1. A method for controlling or preventing infestation of cereal plants by *Fusarium pseudograminearum* comprising applying to a crop of plants, the locus thereof, or seed thereof, a compound according to formula (Ic)

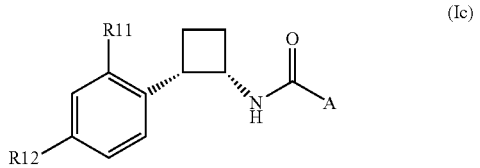

(Ic)

wherein R11 is Cl, R12 is Cl and A is 2-trifluoromethyl-pyrid-3-yl or a tautomer or stereoisomer thereof.

2. The method according to claim 1, wherein the compound according to formula (Ic) is applied to a seed.

3. The method according to claim 2, wherein the rate of application to the seed is in the range of 0.002 and 0.03 mg of the compound according to formula (Ic) per seed.

4. The method according to claim 2, wherein the seed is wheat or barley.

5. The method according to claim 2, wherein the seed is wheat.

6. The method according to claim 5, wherein the rate of application to the seed is in the range of 0.002 and 0.03 mg of the compound according to formula (Ic) per seed.

7. The method according to claim 5, wherein the rate of application to the seed is in the range of 0.002 and 0.015 of the compound according to formula (Ic) AI per seed.

8. The method according to claim 1, wherein the compound is applied to the crop of plants.

9. The method according to claim 8, wherein the crop is wheat or barley.

10. The method according to claim 8, wherein the crop is wheat.

11. The method according to claim 1, wherein the compound is applied to the locus thereof.

12. The method according to claim 11, wherein the crop is wheat or barley.

13. The method according to claim 11, wherein the crop is wheat.

14. The method according to claim 1, further comprising identifying a field under disease pressure from *Fusarium pseudograminearum*.

15. The method according to claim 14, wherein identifying comprises taking soil samples.

16. The method according to claim 14, wherein identifying comprises reviewing historical data of the field.

17. The method according to claim 14, wherein the Fusarium pseudograminearum is resistant to other fungicides.

18. The method according to claim 1, wherein yield in the crop is increased by at least about 26% compared to untreated control.

19. The method according to claim 18, wherein disease is reduced by at least about 34% compared to untreated control.

20. The method according to claim 1, wherein disease is reduced by at least about 34% compared to untreated control.

21. A method of producing a crop of cereal plants under disease pressure from *Fusarium pseudograminearum*, comprising:
    identifying a field under disease pressure from *Fusarium pseudograminearum*;
    treating a cereal seed with a seed treatment comprising, a compound according to formula (Ic)

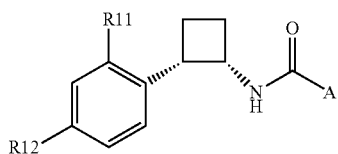

wherein R11 is Cl, R12 is Cl and A is 2-trifluoromethyl-pyrid-3-yl; and
    cultivating the treated cereal seed in the field.

22. The method according to claim 21, wherein the cereal seed is wheat.

23. The method according to claim 22, wherein the compound according to formula (Ic) is treated to the seed at a rate of between 0.002 and 0.03 mg per seed.

24. The method according to claim 23, wherein yield in the crop is increased by at least about 26% compared to untreated control.

25. The method according to claim 24, wherein disease is reduced by at least about 34% compared to untreated control.

26. The method according to claim 23, wherein disease is reduced by at least about 34% compared to untreated control.

27. The method according to claim 1, wherein the compound of formula (Ic) is present in a ratio of greater than 4:1 compared to the enantiomer thereof.

28. The method according to claim 21, wherein the compound of formula (Ic) is present in a ratio of greater than 4:1 compared to the enantiomer thereof.

* * * * *